3,232,988
ALKYLENE OXIDE ADDUCTS OF N-ALKYLACRYLAMIDES

David Randal Sexsmith, Norwalk, Conn., and Edward Helmut Sheers, Flushing, N.Y., assignors to American Cyanamid Company, Stamford, Conn., a corporation of Maine.
No Drawing. Filed May 25, 1964, Ser. No. 370,055
6 Claims. (Cl. 260—561)

This application is a continuation-in-part of application Serial No. 164,142, filed January 3, 1962, now abandoned.

The present invention relates to alkylene oxide adducts of aliphatic nitrogen compounds containing amide linkages and more particularly relates to O-alkylene oxide adducts of N-alkyl-β-hydroxypropionamides, which adducts demonstrate interesting properties as non-ionic detergents and non-ionic surface active agents.

A large number of non-ionic detergents, sometimes referred to as the "ethylene oxide" type, are known and widely employed for various industrial purposes. For the most part, ethylene oxide type non-ionic detergents heretofore available are characterized by their poor degradability by the organisms in sewage treatment plants and septic tanks. Because of their unusual structure, our materials are readily biodegradable.

Accordingly it is an object of the present invention to provide a novel class of non-ionic detergents which are good detergents and are biodegradable.

It is a further object of the present invention to provide a novel and simple process for preparing such non-ionic detergents and in particular to the providing of such a process employing N-alkylacrylamides of relatively low cost which can be employed in a relatively straightforward economical procedure.

These and other objects and advantages of the present invention will become more apparent from the detailed description thereof set forth hereinbelow.

In accordance with the present invention, novel O-alkylene oxide adducts of N-alkyl-β-hydroxypropionamides are prepared having a wide spectrum of properties but which are particularly interesting and useful as non-ionic detergents and non-ionic surface active agents.

By the term "alkylene oxide" as it is employed in the present specification it is intended to include ethylene oxide, propylene oxide and butylene oxide.

By the term "N-alkylacrylamide" as that expression is employed herein it is meant those reaction products formed by reacting a suitable α-unsaturated olefin or mixtures of suitable α-unsaturated olefins and a suitable α-unsaturated nitrile in the presence of a cationoid material such as strong sulfuric acid. Such a reaction is generally known as the Ritter reaction and is described in U.S. Patent No. 2,573,673. The α-unsaturated olefins or mixtures thereof going to comprise the alkyl group of the N-alkylacrylamides contemplated for use in this invention are those characterized by having from 10 to about 40 carbon atoms and preferably from 10 to about 20 carbon atoms. Preferably mixtures of these materials should be characterized as being predominantly straight chained, that is, having at least 75% of the content thereof as straight chained material. Mixtures so characterized are available from the petroleum industry. As examples of suitable α-unsaturated olefins, the following are illustrative: decene-1, undecene-1, dodecene-1, tridecene-1, tetradecene-1, pentadecene-1, hexadecene-1, octadecene-1, telomers of isopropylene and isobutylene such as propylene tetramer, propylene hexamer, triisobutylene, tetraisobutylene, and mixtures of two or more of such α-unsaturated olefins or their equivalents.

The α-unsaturated nitriles illustratively might be: acrylonitrile, α-substituted acrylonitrile such as methacrylonitrile, α-chloroacrylonitrile and β-substituted acrylonitriles such as crotononitrile, β-chloroacrylonitrile and other such materials.

Ritter reaction products or N-alkylacrylamines contemplated for use in the present invention are typically N-($C_{10}$-$C_{40}$) acrylamides such as N-decylacrylamide, N-undecylacrylamide, N-dodecylacrylamide, N-tridecylacrylamide, N-hexadecylacrylamide, N-octadecylacrylamide and mixtures and combinations of these and other equivalent materials.

The adducts contemplated by the instant invention may be prepared by reacting an alkylene oxide and the N-alkylacrylamide in a mole ratio of from about 1:4 up to 100:1 and more. By varying the molar ratio of alkylene oxide to acrylamide, the physical and chemical properties and characteristics of the final products may be varied over a wide spectrum. It has been found that adducts prepared in accordance with the present invention make highly useful non-ionic detergents and surfactants when the adducts are prepared by reacting the oxide and the acrylamide in relative mole ratios of from about 1:1 to 20:1.

The adducts of this invention are characterized by the following structure:

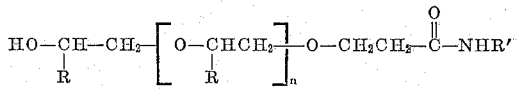

where $n$ is from 1 to 100 inclusive, R is H, —$CH_3$ or —$C_2H_3$ and R' is long chain alkyl typically within the range of $C_{10}$-$C_{40}$.

These adducts have been characterized by infrared analysis which demonstrated that the —NH bond was unchanged in the reaction and that the carbon carbon double bond disappeared.

It should be noted that physical mixtures of an alkylene oxide polymer with the alkylacrylamide still showed the presence of the double bond when subjected to infrared analysis.

The reaction between the alkylene oxide and the N-alkylacrylamide is normally carried out in the presence of an aqueous alkali catalyst, as for example sodium hydroxide, potassium hydroxide, certain organic basic compounds such as guanidine or methyl guanidine, and their equivalents. Preferably the reaction is carried out in the presence of heat and under pressure whereby the rate of reaction is improved. Normally in the formation of the adducts time and temperature are inversely proportional. Thus, as the temperature at which the reaction is carried out is increased the time necessary for reaction is shortened. Normally the reaction will be carried out at temperatures of from about 20° C. to 100° C. and more for from periods of time of from 1 to 15 hours or more. Normally reaction times at temperatures of from between 20° C. and 100° C. are for periods of time of from between 2 and 10 hours.

As indicated above, it is preferable that the reaction be carried out under presure as in an autoclave in order to carry out the reaction with gaseous or low boiling materials, as for example ethylene oxide, propylene oxide and butylene oxide. When employing gaseous or low boiling alkylene oxides, relatively low pressures are sufficient to insure the reaction, as for example initial pressures of from between 10 and 30 pounds and final pressures at the completion of the reaction of from between 150 and 250 pounds have proved satisfactory.

The adducts or products of the present invention vary from oily water-soluble products to wax-like water-soluble products and, when relatively pure reactants are employed, vary in color from light tan to brown.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

*Example 1*

24 parts of N-dodecylacrylamide, 27 parts of ethylene oxide and 5 parts of an aqueous 50% sodium hydroxide solution were heated for 5 hours at 50° C. in an autoclave. At the end of the five-hour period the temperature was raised to 73° and maintained thereat for an additional two-hour period. At the end of this time, the autoclave was cooled and a quantitative yield of the 5 to 6 mole adduct was recovered.

*Example 2*

23.8 parts (0.1 mole) of N-dodecylacrylamide, 226.4 parts (0.6 mole) of ethylene oxide and 5 parts of an aqueous 50% sodium hydroxide solution were sealed in an autoclave and heated to 75° C. After 15 minutes the temperature rose to 156° C. The temperature then fell to 75° C. and was held for an additional four-hour period thereafter. The product was a brown viscous gum soluble in water and characterized by surface active properties and by being a detergent.

*Example 3*

238 parts (1.0 mole) of N-dodecylacrylamide, 88 parts (2.0 mole) of ethylene oxide and 50 parts of an aqueous 50% sodium hydroxide solution were reacted as in Example 2. The product was a brown wax slightly soluble in water.

*Example 4*

53 parts (0.164 mole) of N-octadecylacrylamide was heated with 10 parts of an aqueous 50% potassium hydroxide solution to 80° C. in an autoclave. To the hot clave was added slowly 72 parts (1.64 mole) ethylene oxide. A slight exotherm occurred. Heating was continued for 2 hours. The product was a tan wax, soluble in water.

*Example 5*

A mixed N-alkylacrylamide ($C_{11}$–$C_{20}$) (280 parts—1.0 mole) was heated to 75° with 15 parts of an aqueous 50% sodium hydroxide solution in an autoclave. To the hot clave was added slowly 220 parts (5.0 moles) ethylene oxide. The temperature was maintained at 75° for 3 hours. The product was a brown oil, soluble in water.

*Example 6*

322 parts (1.0 mole) of N-octadecylacrylamide was heated to 100° C. with 25 parts of an aqueous 50% sodium hydroxide solution in an autoclave. To the clave was added 695 parts (12.0 moles) propylene oxide. The heating was continued for 4 hours. The product was a brown wax, slightly soluble in water.

*Example 7*

A commercially available "built" detergent in which the detergent is a nonylphenol-ethylene oxide adduct was compared with a "built" detergent formulation employing a non-ionic detergent contemplated by the instant invention, namely an ethylene oxide N-dodecylacrylamide adduct in which the acrylamide to ethylene oxide molar ratio was 4:1.

The formulation of the experimental detergent employing said adduct was as follows:

| | Percent |
|---|---|
| Adduct of this invention | 20 |
| Sodium tripolyphosphate | 45 |
| Sodium metasilicate | 8 |
| Carboxymethyl cellulose | 1 |
| Sodium sulfate | 26 |

0.1% of this formulation was compared with 0.1% of the commercially available "built" detergent identified above employing a procedure substantially identical to the procedure described as a Terg-O-Tometer single wash method described on page 98 of the text, Detergency Evaluation and Testing, by J. C. Harris, published by Interscience Publishers, 1954.

In employing this procedure, the percent return to original reflectance of the cloth samples was determined in which the percent return to original reflectance was determined by the following equation:

$$\text{Percent return to original reflectance} = \frac{\text{Reflectance after wash} - \text{reflectance before wash}}{\text{Original reflectance (reflectance before soiling)} - \text{reflectance before wash}} \times 100$$

The results of this comparison are set forth in the table hereinbelow.

| | Percent return to original reflectance of soiled cloth |
|---|---|
| Commercial "Built" detergent | 27.2 |
| Built detergent described above | 30.0 |

The amount of active detergent constituent in any "built" formulation will vary within wide limits and will depend to a large extent upon factors such as what is the particular purpose for which the formulation is intended. It has been found that from about 5 to about 95% of the total weight of the formulation may advantageously be the detergent constituent with preferred narrower commercial limits being from about 20 to about 35% by weight of such formulations.

The detergent formulations may also have added to it various other specific building agents or fillers, including soda ash, sodium sesquicarbonate, sodium tetrapyrophosphate, sodium tripolyphosphate, sodium silicate, sodium metasilicate, borax and the like. In addition, non-alkaline inorganic salts such as sodium sulfate, sodium chloride, sodium bicarbonate may be incorporated, as may scouring abrasives such as diatomaceous earth or ground pumice, bentonite, clays of various types. In addition, suds and detergency boosters such as lauryl ethanolamide may be included. Further soil anti-redeposition agents such as carboxymethyl cellulose, cyanoethylated starches and the like may be employed in a conventional amount and in a conventional manner. The amount of special purpose additives or "builders" will naturally vary within wide limits or may be even omitted entirely. Within the commercial ranges of the present invention, however, amounts of from between about 1 up to as high as 80% by weight based on the formulation weight of such materials may be added depending particularly upon the purpose for which the formulation is intended.

The non-ionic detergents of the present invention whether alone or as employed in built formulations may be used as low foam detergents for specialized uses as automatic washers, as foam stabilizers and in various toilet preparations.

*Example 8*

Four solutions containing one part per million of surface active agent were prepared as follows:

*Solution 1.*—Isooctylphenoxy polyethoxy ethanol in deionized water.

*Solution 2.*—Isooctylphenoxy polyethoxy ethanol in stream water.

*Solution 3.*—The condensation product of 4 moles of ethylene oxide to 1 mole of dodecylacrylamide prepared as in accordance with the present invention in deionized water.

*Solution 4.*—The condensation product of 4 moles of ethylene oxide to 1 mole of dodecylacrylamide prepared as in accordance with the present invention in stream water.

Initially, each of the four above-described solutions foamed noticeably. After standing for one day in closed containers, Solutions 1, 2 and 3 still foamed noticeably upon shaking, whereas Solution 4 did not.

Example 8 hereinabove demonstrates the improved biodegradability of the non-ionic surface active agents of this invention as compared with a well known commercially available non-ionic surface active agent.

We claim:

1. A compound of the formula

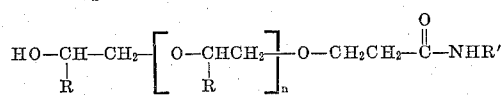

where $n$ is from 1 to 100 inclusive, R is selected from the group consisting of H, —CH$_3$ and —C$_2$H$_3$, and R' is a long chain alkyl group containing from 10 to 40 carbon atoms.

2. A compound according to claim 1 where R is H.
3. A compound according to claim 1 where R is —CH$_3$.
4. A compound according to claim 1 where $n$ is from 1 to 20.
5. A process for preparing a compound of the formula

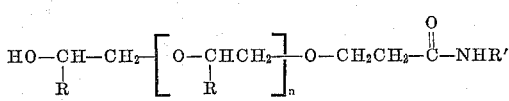

where $n$ is from 1 to 100 inclusive, R is selected from the group consisting of H, —CH$_3$ and —C$_2$H$_3$, and R' is a long chain alkyl group containing from 10 to 40 carbon atoms, which comprises reacting an alkylene oxide with an N-alkylacrylamide in the presence of a strong aqueous alkali catalyst.

6. A process for preparing a compound of the formula

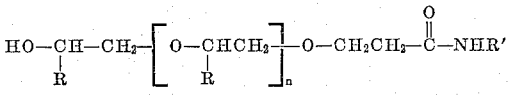

where $n$ is from 1 to 20 inclusive, R is selected from the group consisting of H, —CH$_3$ and —C$_2$H$_3$, and R' is a long chain alkyl group containing from 10 to 40 carbon atoms, which comprises reacting an alkylene oxide with an N-alkylacrylamide in the presence of a strong aqueous alkali catalyst.

References Cited by the Examiner

UNITED STATES PATENTS 2,808,397   10/1957   Stroh et al. _____ 260—89.7
3,037,056   5/1962   Lowe et al. _____ 260—561

FOREIGN PATENTS 489,026   12/1952   Canada.

WALTER A. MODANCE, *Primary Examiner.*